US008312169B2

(12) United States Patent
Perumal et al.

(10) Patent No.: US 8,312,169 B2
(45) Date of Patent: *Nov. 13, 2012

(54) INTER-WORKING BETWEEN NETWORK ADDRESS TYPE (ANAT) ENDPOINTS AND INTERACTIVE CONNECTIVITY ESTABLISHMENT (ICE) ENDPOINTS

(75) Inventors: Muthu Arul Mozhi Perumal, Bangalore (IN); Ram Mohan R., Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/404,944

(22) Filed: Feb. 24, 2012

(65) Prior Publication Data

US 2012/0158974 A1 Jun. 21, 2012

Related U.S. Application Data

(62) Division of application No. 12/464,556, filed on May 12, 2009, now Pat. No. 8,185,660.

(51) Int. Cl.
*G06F 15/16* (2006.01)
(52) U.S. Cl. .......................... 709/245; 709/238; 709/249
(58) Field of Classification Search .................. 726/5, 3; 709/228, 227, 224, 206; 370/401, 400, 395.54, 370/395.2, 392, 389, 352, 261, 254, 252, 370/248, 242, 230
See application file for complete search history.

(56) References Cited

U.S. PATENT DOCUMENTS

| 2007/0019619 | A1 | 1/2007 | Foster et al. |
| 2007/0101414 | A1 | 5/2007 | Wing et al. |
| 2008/0071544 | A1 | 3/2008 | Beaufays et al. |
| 2009/0304025 | A1 | 12/2009 | Boucadair et al. |

OTHER PUBLICATIONS

Rosenberg, J., dynamicsoft, "Interactive Connectivity Establishment (ICE): a Methodology for Network Address Translation (NAT) Traversal for the Session Initiation Protocol (SIP)," Internet article, Feb. 24, 2003, 21 pages.
Camarillo et al., "The Alterative Network Address Types (ANAT) Semantics for the Session Description Protocol (SDP) Grouping Framework," Internet article, Network Working Group, Cisco Systems, Jun. 2005, 7 pages.
Rosenberg, Jonathan, "Interactive Connectivity Establishment: ICE," PowerPoint Presentation dated Nov. 2006, 42 pages.
Rosenberg, J., Interactive Connectivity Establishment (ICE): a Protocol for Network Address Translation (NAT) Traversal for Offer/Answer Protocols draft-ietf-mmusic-ice-19, the Session Initiation Protocol (SIP), Internet Article, Oct. 29, 2007, 120 pages.

*Primary Examiner* — David Lazaro
*Assistant Examiner* — Charles Murphy
(74) *Attorney, Agent, or Firm* — Brinks Hofer Gilson & Lione

(57) ABSTRACT

A method for inter-working between an alternative network address type (ANAT) endpoint and an interactive connectivity establishment (ICE) is provided. The method may include identifying one or more network addresses operable to be used to communicate with a alternative network address type (ANAT) endpoint. One or more candidates operable to be used for interactive connectivity establishment (ICE) traversal may also be identified. A preferred network address may be determined from the one or more network addresses based on an ANAT endpoint preference. A corresponding candidate may be determined based on the ANAT endpoint preference. The corresponding candidate may use a candidate address to communicate. A media stream may be established between the preferred network address and the corresponding candidate address.

13 Claims, 10 Drawing Sheets

ANAT MESSAGE 300

- 310 — v=0
- 320 — o=bob 2807447430 2897763 1 IN IP4 host.example.com
- 330 — s=
- 340 — t=0 0
- 350 — a=group:ANAT 1 2
- 360 — m=audio 25000 RTP/AVP 0
- 362 — c=IN IP6 2001:DB8::1
- 364 — a=mid:1
- 370 — m=audio 22334 RTP/AVP 0
- 372 — c=IN IP4 192.0.2.1
- 374 — a=mid:2

FIGURE 3

ICE MESSAGE 600

610 → v=0
620 → o=bob 2807744730 2897763 1 IN IP4 host.example.com
630 → s=
640 → t=0 0
650 → c=IN IP6 2001:DB9::1
660 → m=audio 25000 RTP/AVP 0
662 → a=candidate:1 1 UDP 2130706431 2001:DB9::1 25001 host
664 → a=candidate:1 1 UDP 1694498815 192.0.2.2 22335 host

FIGURE 6

INTER-WORKING BETWEEN NETWORK ADDRESS TYPE (ANAT) ENDPOINTS AND INTERACTIVE CONNECTIVITY ESTABLISHMENT (ICE) ENDPOINTS

CROSS-REFERENCE TO RELATED APPLICATIONS

This application is a divisional application of U.S. patent application Ser. No. 12/464,556, filed May 12, 2009, now U.S. Pat. No. 8,185,660 which is hereby incorporated by reference in its entirety.

FIELD OF TECHNOLOGY

The present embodiments relate to the inter-working between alternative network address type (ANAT) endpoints and interactive connectivity establishment (ICE) endpoints. The present embodiments may be used to negotiate a media stream path between an ANAT endpoint and an ICE endpoint.

BACKGROUND

An ANAT endpoint may be operable to indicate multiple network address types (e.g., IPv4, v6) on which the ANAT endpoint can receive media. An ICE endpoint may use ICE to traverse network address translation (NAT) network devices, such as gateways. Because of the way ANAT endpoints and ICE endpoints communicate, ANAT endpoints and ICE endpoints may be unable to establish a media stream.

BRIEF DESCRIPTION OF THE DRAWINGS

FIG. 3 illustrates one embodiment of an ANAT message with a session description that includes ANAT semantics;

FIG. 6 illustrates one embodiment of an ICE message with a session description that includes ICE semantics;

DETAILED DESCRIPTION

Figure 1:
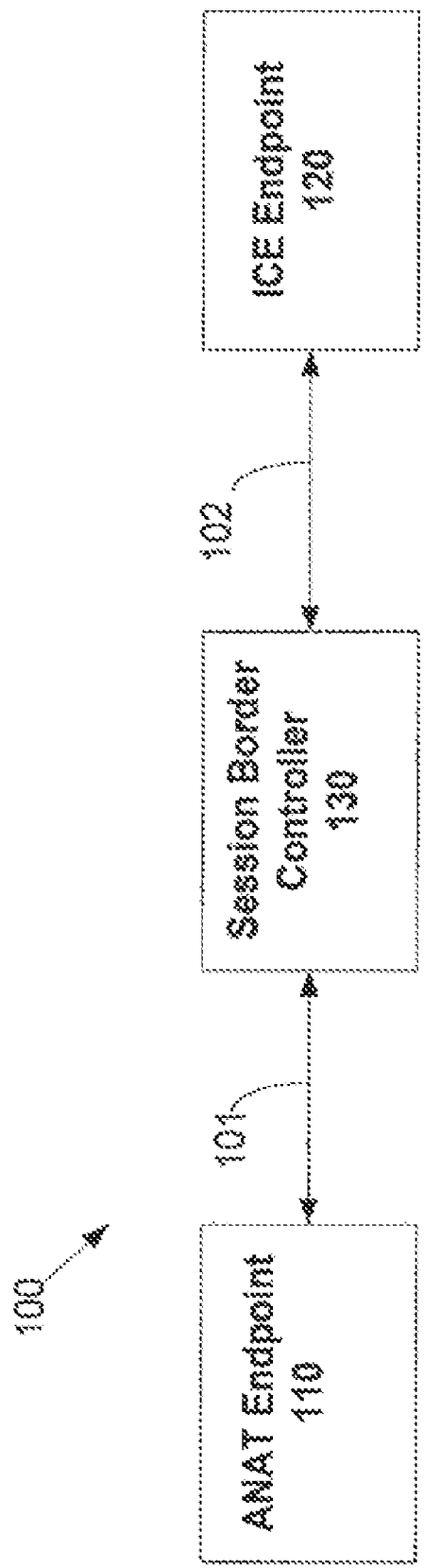
FIG. 1 illustrates one embodiment of a system for establishing a media path.

The present embodiments relate to an inter-working between a alternative network address type (ANAT) endpoint and an interactive connectivity establishment (ICE) endpoint. As used herein, "inter-working" may include determining a preferred local network address (or candidate) and selecting a corresponding remote candidate (or network address). Selecting a corresponding remote network address (or candidate) may include calculating priority of one or more network addresses (or candidates) based on a local preference, a remote preference, or both a local and remote preference. As used herein, "preferred" includes given priority over other addresses or candidates. The term "local" relates to the endpoint initiating a media session and the term "remote" relates to the endpoint being requested to join a media session. In one example, the local endpoint may invite the remote endpoint to join a media session. The remote endpoint may accept the invitation. The terms local and remote may vary depending on perspective. A "candidate" may include an Internet Protocol (IP) address or port used to traverse a network address translation (NAT) network device. A NAT network device is a device that is operable to modify network address information in datagram packet headers while in transit for the purpose of remapping a given address space into another. The inter-working may be used to negotiate a media stream path between the preferred local address or candidate and the corresponding remote address or candidate.

A session border controller (SBC) may provide the inter-working. The session border controller may be located between the ANAT endpoint and the ICE endpoint. The session border controller may determine a preferred local address (or candidate) based on a local preference. The session border controller may determine a corresponding remote address (or candidate) based on the local preference, the remote preference, or both the local preference and remote preference. Determining the corresponding remote address (or candidate) may include calculating priority of one or more remote addresses (or candidates) and comparing the priorities against each other. Calculating priority may include calculating priority based on the local preference, the remote preference, or both the local preference and remote preference. The session border controller may establish a media stream path between the preferred local address (or candidate) and the corresponding remote address (or candidate). As used herein, "semantics" may include attributes, formatting, organization, or other coordination.

In one embodiment, the ANAT endpoint may be the local endpoint and the ICE endpoint may be the remote endpoint. Accordingly, the local preference may be an ANAT endpoint preference and the remote preference may be an ICE endpoint preference. In an alternative embodiment, the ICE endpoint may be the local endpoint and the ANAT endpoint may be the remote endpoint. The local preference may be an ICE endpoint preference and the remote preference may be an ANAT endpoint preference.

In one aspect, a method for establishing a media path between an alternative network address type (ANAT) endpoint and an interactive connectivity establishment (ICE) endpoint is provided. The method may include identifying one or more network addresses operable to be used to communicate with an alternative network address type (ANAT) endpoint. One or more candidates operable to be used for interactive connectivity establishment (ICE) traversal may also be identified. A preferred network address may be determined from the one or more network addresses based on an ANAT endpoint preference. A corresponding candidate may be determined based on the ANAT endpoint preference. The corresponding candidate may use a candidate address to communicate. A media stream may be established between the preferred network address and the corresponding candidate address.

In a second aspect, a method for inter-working between an alternative network address type (ANAT) endpoint and an interactive connectivity establishment (ICE) endpoint is provided. The method includes receiving a message from a first endpoint that includes a list of one or more network addresses. A preferred network address is determined from the one or more network addresses based on a first preference of the first endpoint. A list of one or more candidates used by a second endpoint to traverse network address translation (NAT) network devices is obtained. A corresponding candidate address from the one or more candidates may be determined based on the first preference. The method may also include transmitting a first message to the first endpoint and a second message to the second endpoint. The first message may define a corresponding candidate address and the second message may define the preferred network address. The corresponding candidate address and the preferred network address may be used to establish a media session path between the first endpoint and the second endpoint.

In a third aspect, a session border controller is provided. The session border controller includes a processor operable to execute instructions and a memory coupled with the processor. The memory is operable to store storing instructions that may be executed to identify one or more network addresses for communicating with a first endpoint; determine a preferred network address from the one or more network addresses, the preferred network address being determined based on a preference for communicating with the first endpoint; identify one or more candidates used by a second endpoint to traverse network address translation (NAT) network devices; and determine a corresponding candidate address from the one or more candidates, the corresponding candidate address being determined based on the preference for communicating with the first endpoint.

In one example, an ANAT endpoint, such as a network router, may be used to place an Internet Protocol (IP) phone call to an ICE endpoint across the Internet. The ICE endpoint may also be a network router. The IP phone call may be routed through a session border controller. The session border controller may be a gateway providing protocol translation for the network routers. The session border controller may obtain a list of one or more network addresses used by the ANAT endpoint and a list of one or more ICE candidates used by the ICE endpoint. The one or more network addresses may be network address types, such as addresses corresponding to different versions of the IP (e.g., IPv4 or IPv6). The session border controller may determine a preferred network address using an ANAT endpoint preference, such as a preference to use an address corresponding to the latest version of the IP (e.g., IPv6). The session border controller may then determine a corresponding ICE candidate from the list of ICE candidates. Determining the corresponding ICE candidate may include calculating priority of the one or more ICE candidates based on the ANAT endpoint preference, an ICE endpoint preference, or both the ANAT endpoint preference and an ICE endpoint preference. The priorities of the one or more ICE candidates may be compared to each other to determine a corresponding candidate. The candidate with the greatest priority may be selected as the corresponding ICE candidate. One benefit of calculating priority based on both the ANAT endpoint preference and ICE endpoint preference is that the selected candidate may correspond to the preferred network address and be a candidate preferred by the ICE endpoint.

FIG. 1 illustrates one embodiment of a system 100 for establishing a media stream path. The media stream path may be used during a media session, such as a video and/or audio conference, IP phone call, or other conference for streaming media. As used herein, the term "streaming media" may include delivering multimedia. Multimedia may include text, audio, still images, animation, video, interactivity content, or any combination thereof. The media stream path may be a route across a telecommunication network and may be defined by a first address at a first end of the path and a second address at a second end of the path.

The system 100 may include an ANAT endpoint 110, an ICE endpoint 120, and a session border controller 130. The ANAT endpoint 110 may be coupled with the session border controller 130 across a network 101. The ICE endpoint 120 may be coupled with the session border controller 130 across a network 102. As used herein, the phrase "coupled with" or "couple . . . with" may include directly connected to or indirectly connected through one or more intermediate components. Such intermediate components may include hardware and/or software based components. In alternative embodiments, the system 100 may include additional, different, or fewer components.

The session border controller 130 may provide an interworking between the ANAT endpoint 110 and the ICE endpoint 120. The session border controller 130 may be operable to receive a list of one or more ANAT network addresses used by the ANAT endpoint 110 (hereinafter network addresses) and a list of one or more ICE candidates used by the ICE endpoint 120 (hereinafter candidates). The session border controller 130 is operable to determine a preferred network address (or candidate) and a corresponding candidate (or network address) based on an ANAT endpoint preference, ICE endpoint preference, or both the ANAT endpoint preference and the ICE endpoint preference. For example, the session border controller 130 may determine a preferred network address and a corresponding candidate when the ANAT endpoint 110 initiates the media session. In another example, the session border controller 130 may determine a preferred candidate and a corresponding network address when the ICE endpoint 120 initiates the media session. The session border controller 130 may establish a media path between the preferred network address (or candidate) and the corresponding candidate (or network address). As a result, a media stream path may be established between the ANAT endpoint 110 and the ICE endpoint 120.

The system 100 may be a combination of one or more communication networks, packet switching networks or other networks used for messaging, streaming media, or transferring data. The ANAT endpoint 110, ICE endpoint 120, session border controller 130, or any combination thereof may be in the same or different networks. For example, the ANAT endpoint 110 and the session border controller 130 may be disposed in a first service provider network and the ICE endpoint 120 may be in a second service provider network. The first service provider network may be different than the second service provider network. The session border controller 130 may be disposed on an edge of the first service provider network. Alternatively, the session border controller 130 may be in the same service provider network as the ICE endpoint 120.

The networks 101 and 102 may include one or more network segments, network connections, or other networking channels. The networks 101, 102 may be packet-switched networks. In one embodiment, the networks 101, 102 include connection oriented networks. Some connection oriented packet-switching protocols include X.25, Frame relay, Asynchronous Transfer Mode (ATM), Multiprotocol Label Switching (MPLS), and Transmission Control Protocol (TCP). Other protocols may be used. In another embodiment, the networks 101, 102 include connectionless networks, such as Ethernet and Internet. Some connectionless protocols are Internet Protocol, and User Datagram protocol. Other protocols may be used. In yet another embodiment, the networks 101, 102 include both connection oriented networks and connectionless networks. The networks 101 and 102 may be part of a telecommunication network.

The ANAT endpoint 110 may be an personal computer, a router, Internet Protocol (IP) phone, IP video terminal, video conferencing system, session border controller, gateway, server, TelePresence system, soft phone, instant messenger (IM) client, Web dialer, endpoint, personal computer running a collaborative application like desktop sharing and shared whiteboard, host, client, multimedia communication device, a Voice over IP (VoIP) communication device, ANAT aware endpoint, or other communication device that is operable to communicate over network 101. The ANAT end point 110 may be operable to include network address types in a session description. The session description may include ANAT semantics. As used herein, "semantics" may include attributes, formatting, organization, or other coordination. One example of an ANAT endpoint 110 is a network router that executes Cisco Unified Communication Manager (CUCM). CUCM is sold by Cisco Technology, Inc. of San Jose, Calif. Another example of an ANAT endpoint 110 is a network router, such as a multi-service access router, which executes Cisco Unified Communications Manager Express (CUCME). CUCME is sold by Cisco Technology, Inc. Although referred to herein as an ANAT endpoint 110, the ANAT endpoint 110 may be any device that is operable to communicate using one or more network address types.

The interactive connectivity establishment (ICE) endpoint 120 may be an personal computer, a router, Internet Protocol (IP) phone, IP video terminal, session border controller, server, gateway, video conferencing system, TelePresence system, soft phone, instant messenger (IM) client, Web dialer, endpoint, personal computer running a collaborative application like desktop sharing and shared whiteboard, multimedia communication device, a Voice over IP (VoIP) communication device, ICE aware endpoint, or other communication device that is operable to communicate over network 102. The ICE endpoint 120 may use ICE to traverse network address translation (NAT) network devices, such as gateways. ICE is a technique for Network Address Translator (NAT) traversal for user data protocol (UDP)-based multimedia sessions established with the offer/answer model. The ICE technique provides one or more candidates for a media stream. The candidates may include IP addresses and ports. The ICE endpoint 120 may be operable to understand ICE and include the candidates in a session description. The session description may include ICE semantics, which provide a framework for describing the candidates in a session description.

The session border controller 130 may be a personal computer, router, gateway, server, or other networking device for relaying information between an ANAT endpoint and an ICE endpoint. In one example, the session border controller 130 may be a router that runs a Cisco Unified Border Element (CUBE), which is sold by Cisco Technology, Inc. of San Jose. The Cisco Unified Border Element may connect enterprise unified communication Session Initiation Protocol (SIP) trunks to the public-switched telephone network (PSTN). The Cisco Unified Border Element may be an integrated software application that is stored on computer readable storage media and executed by a processor. Other networking devices and software applications may be used as the session border controller.

The session border controller 130 may sit between two service provider networks in a peering environment, or between an access network and a backbone network to provide service to residential and/or enterprise customers. The session border control 130 may provide a variety of functions to enable or enhance session based multimedia services, such as perimeter defense like access control, topology hiding, denial of service (DOS), and detection and prevention. The session border controller 130 may provide functionality not available in the endpoints 110, 120, such as NAT and Firewall traversal, protocol interworking/repair, including interworking between ANAT and ICE. The session border controller 130 may be a traffic management device that is operable for media monitoring/reporting and enforcing Quality of Service (QoS).

Figure 2:
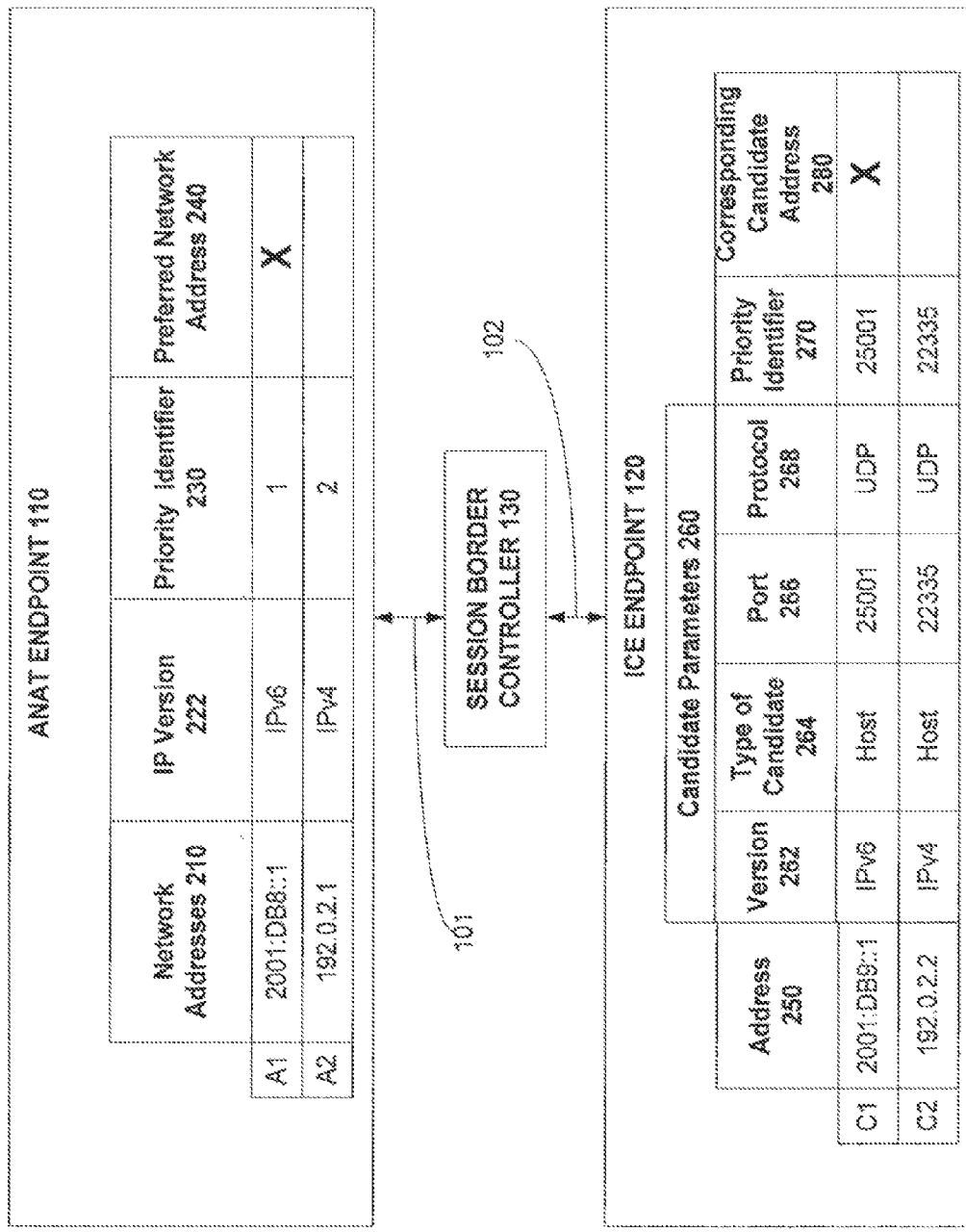
FIG. 2 illustrates an example of the system shown in FIG. 1.

FIG. 2 illustrates one example of the system 100. FIG. 2 illustrates network address descriptions A1, A2 associated with an ANAT endpoint 110, candidate descriptions C1, C2 associated with an ICE endpoint 120, and a session border controller 130 that couples the ANAT endpoint 110 with the ICE endpoint 120. As used herein, "associated with" may include operable to be used by, gathered by, assigned to, or previously used. FIG. 2 illustrates a system 100 including a session border controller 130 that is operable to determine a preferred network address 240 and select a corresponding candidate address 280. Alternatively, or additionally, the session border controller 130 may be operable to determine a preferred candidate and select a corresponding network address.

The network address descriptions A1, A2 may define one or more network addresses, such as network addresses 210. The ANAT endpoint 110 may be operable to communicate using the one or more network addresses. The network addresses may correspond to the same or different IP versions 220. For example, the network address "2001:DB8::1" may correspond to IP version 6 (IPv6). The network address "192.0.2.1" may correspond to IP version 4 (IPv4). The ANAT endpoint 110 may define a list of network addresses 210. As used herein, the term "list" may include a listing, spreadsheet, graph, illustration, or other grouping.

The ANAT endpoint 110 may determine a preferred network address, such as preferred network address 240. Determining a preferred network address may include calculating priorities for the one or more network addresses, comparing the calculated priorities, and selecting a network address with the greatest priority as the preferred network address. The priorities may be calculated based on an ANAT endpoint preference, such as a preference to communicate using the latest version of the IP. Other ANAT endpoint preferences may be used. Some examples of other ANAT endpoint preferences include preferences related to traffic criteria, preferences related to quality of service (QoS) criteria, or other preferences. In the example of FIG. 2, when the ANAT endpoint preference is a preference to communicate using the latest version of the IP, the network address "2001:DB8::1" may have a greater priority than network address "192.0.2.1" because IPv6 is a newer version of the IP than IPv4. The ANAT endpoint preference may be dynamically determined or stored in memory.

The ANAT endpoint 110 may assign priority identifiers 230 to the network addresses 210 based on the calculated priorities. The priority identifiers 230 may indicate preference of a network address in relation to the other network addresses. For example, a preferred network address 240 is assigned a priority identifier 230 of "1", which may indicate greater preference over a preference identifier of "2." Lower numbers (e.g., "1") may indicate preference over higher numbers (e.g., "2"). In another example, higher numbers (e.g., "2") may indicate greater preference over lower numbers (e.g., "1"). Other priority identifiers 230, such as letters, symbols, markings, or other indicia, may be used. The priority identifiers 230 may be any identifier that indicates preference over other identifiers.

The different IP versions 220 of the network addresses 210 are not limited to IPv4 and IPv6. Any type of network address, including, but not limited to, addresses for future versions of the Internet Protocol, may be used. Other network parameters 220 may be used to determine a preferred network address 240.

The ANAT endpoint 110 may be operable to communicate with the session border controller 130. Communication may include transmitting and/or receiving an ANAT message. The ANAT message may be an offer message, request message, or an answer message. For example, the ANAT message may be an offer message when the ANAT endpoint 110 is initiating a media session. The ANAT message may be an answer message when the ANAT endpoint 110 is being requested to join a media session. The ANAT endpoint 110 may respond to the request message with an answer message. The ANAT message may be transmitted or received using the Session Initiation Protocol (SIP), Session Announcement Protocol (SAP), Real Time Protocol (RTP), or other session establishment protocol.

The ANAT endpoint 110 may include all, some, or none of the network address descriptions A1, A2 in a session description of the ANAT message. As a result, the ANAT message may include a list of the network addresses 210, IP versions 220, priority identifiers 230, or any combination thereof. The session description may describe multimedia sessions for the purposes of session announcement, session invitation, and other forms of multimedia session initiation or multimedia session establishment. Alternatively, or additionally, the ANAT message may include codecs used in transferring the media during the media session and other information for inter-working between the ANAT endpoint 110 and the ICE endpoint 120. For example, the ANAT message may include an ANAT endpoint preference.

The ANAT endpoint 110 may be operable to format the ANAT message according to the Session Description Protocol (SDP) or Real Time Streaming Protocol (RTSP), a combination thereof, or any other protocol for formatting messages to include a session description. The Session Description Protocol is a format for describing streaming media initialization parameters in an American Standard Code for Information Interchange (ASCII) string. The Session Description Protocol may be used to describe multimedia communication sessions for the purposes of session announcement, session invitation, and other forms of multimedia session initiation. The Session Description Protocol does not provide the content of the media form itself but provides a negotiation between two end points to allow them to agree on a media type and format.

FIG. 3 illustrates an exemplary ANAT message 300 formatted according the Session Description Protocol. The ANAT message 300 may include a session description including a session identifier description, a time description, and a media description. The session identifier description may include a protocol version line 310, originator and session identifier line 320, and a session name line 330. The time description may include a time line 340 that defines the time the session is active. The media description may include one or more media description lines 360, 370, one or more connection information lines 362, 372, and one or more media attribute lines 350, 364, 374. Each line may include an attribute name and a media value. The attribute name may be a single character followed by an '='. The attribute name may be used to identify or determine the attribute value on that line.

The media attribute line 350 may include an ANAT header. The ANAT header may indicate that one or more network addresses 210 are included in the ANAT message. The ANAT header may be used to indicate that the ANAT endpoint 110 may communicate using alternative network addresses, which are included in the ANAT message, but that the ANAT endpoint 110 would prefer to communicate using the network address with the highest preference (i.e., the preferred network address). The ANAT endpoint 110 may include a priority identifier 230 in the ANAT message 300, for example, in lines 364 and 374. The ANAT endpoint 110 may use the preference identifier to define the preferred network address 240. In other words, the ANAT header may be used to indicate that once the preferred network address 240 is identified, the ports of the rest of the 'm' lines of the session description should be set to zero.

The media description lines 360, 370 may be used to describe the type of media being transferred, for example, audio, video, a combination thereof, or other type of media. The connection information lines 362, 372 may be used to list one or more network addresses (e.g., 2001:DB8::1 or 192.0.2.1) and the types of network addresses (e.g., IPv4 or IPv6). The media attribute lines 364, 374 may be used to describe the preference of a corresponding network address. As discussed above, media attribute lines 364, 374 may include preference identifiers. A lower preference identifier (e.g., "mid:1") may have greater preference than a higher preference identifier (e.g., "mid:2"). Other preference identifiers may be used. Any number, letter, or combination thereof may be used as preference identifiers.

Figure 4:
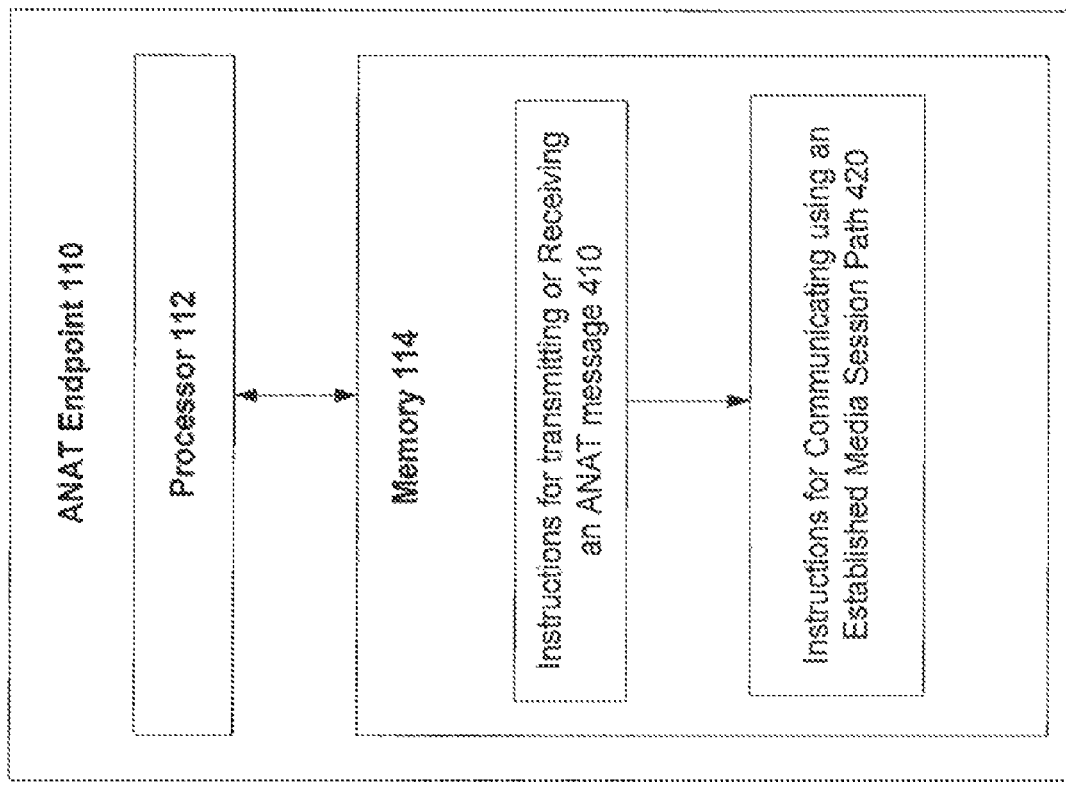
FIG. 4 illustrates one embodiment of an ANAT endpoint.

FIG. 4 shows one embodiment of the ANAT endpoint 110. The ANAT endpoint 110 may include a processor 112 and memory 114. The processor 112 may be communicatively coupled to the memory 114. The memory 114 may be a computer readable storage medium that stores computer readable instructions, such as instructions for establishing a media session. The processor 112 may execute the instructions to establish a media session with the ICE endpoint 120. The instructions may include instructions for transmitting and/or receiving an ANAT message 410, and instructions for communicating using an established media session path 420. The instructions 410 may include instructions for identifying one or more network addresses and including (e.g., embedding) the one or more network addresses in an ANAT message. The ANAT message may be transmitted to or received from the session border controller 130. The instructions 420 may include instructions for streaming or receiving streamed media regardless of the nature of the other endpoint and/or from the ICE endpoint 120. The network addresses 210 may be used for streaming media to and from the ANAT endpoint 110. Other instructions may be stored in the memory 114 and executed by the processor 112.

Referring back to FIG. 2, the ICE endpoint 120 may use one or more candidates to traverse network address translation network devices. As shown in FIG. 2, the candidate descriptions C1, C2 may describe addresses, parameters, or attributes of the candidates. Accordingly, the candidates may be referred to herein as candidates C1, C2. The candidates C1, C2 may reside at candidate addresses 250. The candidate addresses 250 may be used to traverse the network address translation network devices. The candidate addresses 250 may be used for streaming media, for example, to the ANAT endpoint 110. In the example of FIG. 2, the candidate address 250 for candidate C1 is "2001:DB9::1" and the candidate address 250 for candidate C2 is "192.0.2.2". The candidate parameters 260 may further describe the candidates C1, C2. The candidate parameters 260 may include the IP version 262, type of candidate 264, port address 266, and messaging protocol type 266.

The IP version 262 may be the version of the IP used with the candidates C1, C2. For example, the IP version 262 for candidate C1 is IPv6. The port address 266 may be an address for a port where the candidate C1, C2 resides. For example, the port address 266 for candidate C1 is "25001." The messaging protocol type 262 may be the protocol used for messaging with the one or more candidates C1, C2. Any protocol may be used. In one example, the messaging protocol for messaging with the candidates C1, C2 is the user datagram protocol (UDP).

Figure 5:
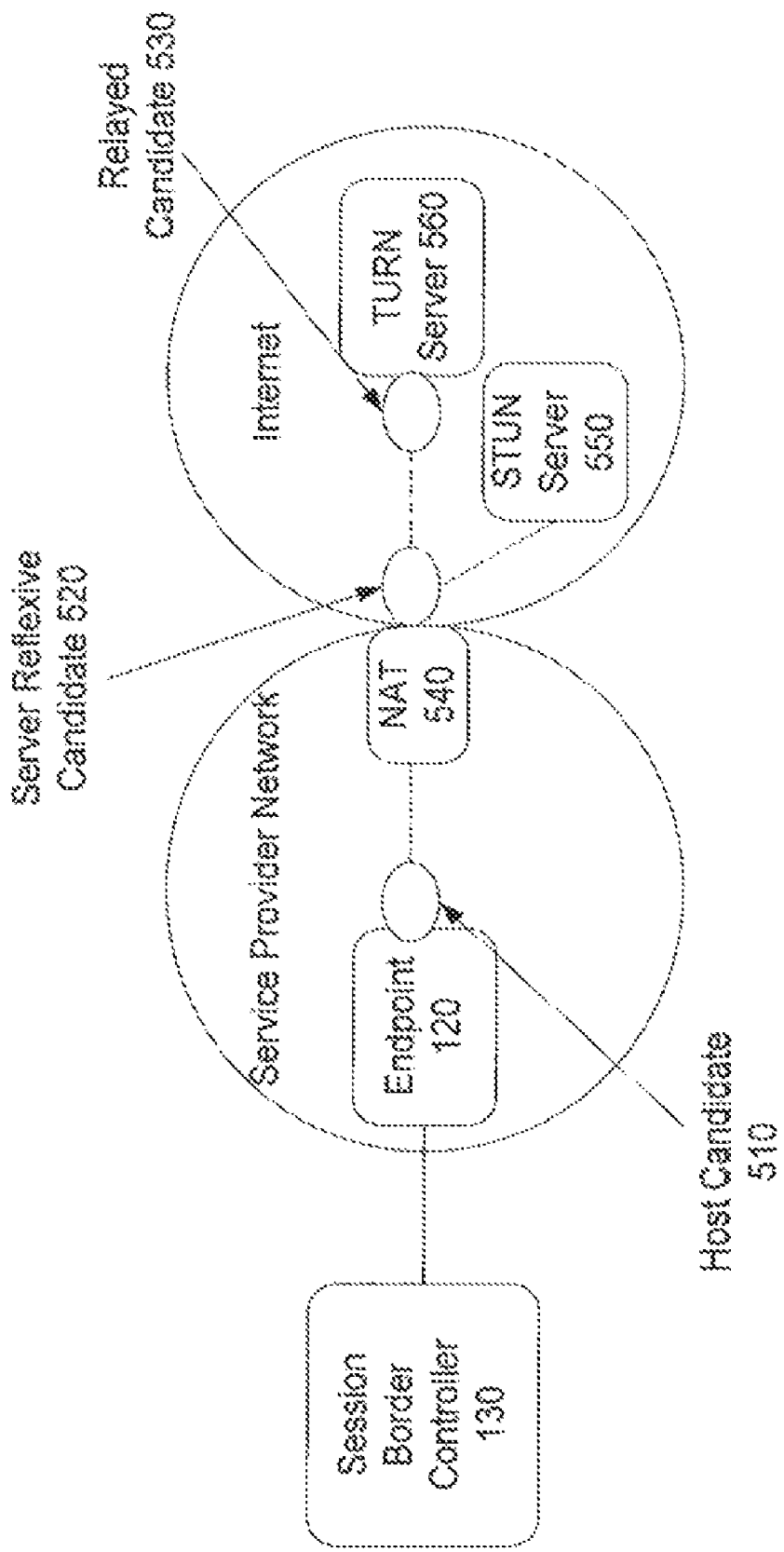
FIG. 5 illustrates one embodiment of candidates gathered by an ICE endpoint or session border controller.

FIG. 5 illustrates various types of candidates 264 that may be gathered. The types of candidates may include host candidates 510, server reflexive candidates 520, and relayed candidates 530. The host candidate 510 may reside on the ICE endpoint 120. The host candidate 510 may be an IP address on a physical interface and/or a logical interface. A server reflexive candidate 520 may reside on the network address translation (NAT) network device 540 (hereinafter NAT 540). The NAT network device 540 may be a device that is operable to modify network address information in datagram packet headers while in transit for the purpose of remapping a given address space into another. The server reflexive candidate 520 may relate to the internal transport address used as the source for the Session Traversal Utilities for NAT (STUN) binding request between the NAT 540 and the STUN Server 550. The server reflexive candidate 520 may be learned by the STUN server 540 using a binding request or a Traversal Using Relay NAT (TURN) server 560, which provides both a relayed candidate 530 and server reflexive candidate 520. Peer reflexive candidates are also a type of candidate. For cases where there are multiple NATs between ICE endpoint 120 and a STUN server, ICE discovers the peer reflexive addresses during connectivity checks. The peer reflexive candidate may reside in the intermediate NATs. A relayed candidate 530 may include candidates obtained by sending TURN allocate request from a host candidate to a TURN server 560. The relayed candidate 530 is resident on the TURN server, and the TURN server relays packets back towards the ICE endpoint 120.

The ICE endpoint 120 may gather the candidates C1, C2 used by the ICE endpoint 120. Gathering candidates may include gathering candidate addresses 250 and/or candidate parameters 260. The candidates 250 may be gathered using Session Traversal Utilities for NAT (STUN). Traversal Using Relay NAT (TURN), an extension to STUN, may also be used to locate candidates C1, C2 having IP addresses 252 and ports 266. The candidates C1, C2 may be used to allow for address 252 selection for multi-homed and dual-stack hosts.

Gathering candidates may include sending a request message, for example, using a STUN server or TURN server. For example, a STUN response, which is received in response to a request sent to a STUN server, may have a server reflexive candidate in the MAPPED-ADDRESS attribute. A STUN response received in response to a request sent to a TURN server may have the relayed address allocated by TURN server in the XOR-RELAYED-ADDRESS attribute. A peer reflexive address may be gathered during ICE connectivity checks by discovering other NATs in the media path.

Referring back to FIG. 2, the ICE endpoint 120 and session border controller 130 may exchange one or more ICE messages. An ICE message may be used during a messaging session. For example, the ICE message may be an offer message or an answer message. The ICE message may be formatted according to various protocols, such as the Session Initiation Protocol (SIP), Session Announcement Protocol (SAP), or Real Time Protocol (RTP). The ICE message may include a list of one or more candidates C1, C2 and/or candidate parameters 260 that may be used by the ICE endpoint 120.

The ICE message may include a session description used to establish one or more media streams. The session description may include a list of candidates that may be used for streaming media. For a particular media stream, the session description may include the candidates that may be used when transferring the multimedia. The ICE message may be an offer to establish a messaging session. In one embodiment, the session border controller 130 may gather candidates C1, C2 and transmit an ICE message, formatted as an offer message, to the ICE endpoint 120. The ICE message may include a list of candidates that may be used for streaming media.

The ICE endpoint 120 may format the ICE message according to the Session Description Protocol (SDP), Real Time Streaming Protocol (RTSP), a combination thereof, or any other protocol for formatting media streams.

FIG. 6 illustrates one example of an ICE message 600 formatted according to Session Description Protocol (SDP). The ICE message 600 may include a session description including a session identifier description, time description, and a media description. The session identifier description may include a protocol version line 610, originator and session identifier line 630, and a session name line 620. The time description may include a time line 640 that defines the time the session is active. The media description may include one or more connection information lines 650, one or more media description lines 660, and one or more media attribute lines 662, 664. Each line may include an attribute name and an attribute value.

The attribute name may be a single character followed by an '='. The attribute name may be used to identify or determine the attribute value on that line. The attribute value may define a session parameter. The connection information line 650 may include a default candidate. The default candidate may be chosen by the session border controller 130 to correspond with the preferred network address. The connection information line 650 may include an IP address for the default candidate. The media description line 660 may include a description of the type of media to be streamed. The media attribute lines 662, 664 may include a candidate description. The candidate description may include a candidate foundation identifier (e.g., 1), component identification (ID) (e.g., 1), a protocol identifier (e.g., "UDP"), an ICE priority identifier, the IP address (e.g., 2001:DB9::1), a port address (e.g., 25001), and the type of the candidate (e.g., host).

Figure 7:
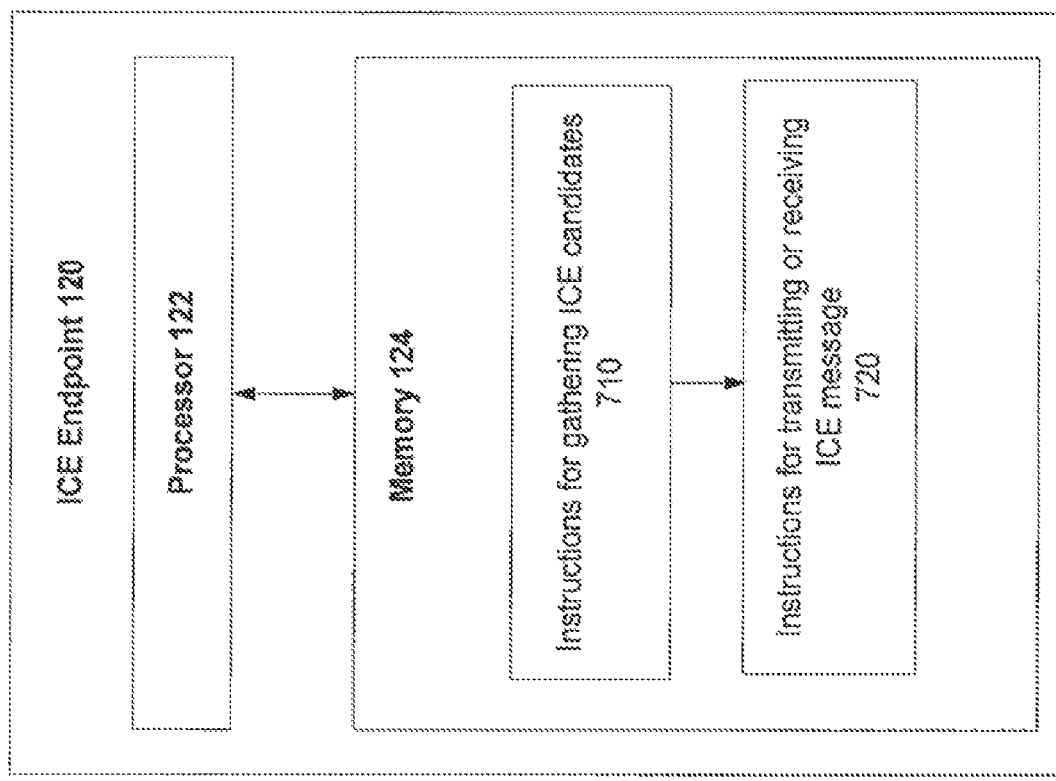
FIG. 7 illustrates one embodiment of an ICE endpoint.

FIG. 7 illustrates one embodiment of an ICE endpoint 130. The ICE endpoint 130 may include a processor 122 and memory 124. The processor 122 may be coupled with the processor 122. The processor 122 may execute instructions stored on the memory 124. The memory may include instructions for gathering candidates 710. The instructions 710 may be executed to gather ICE candidates, for example, by requesting, accessing, or otherwise obtaining candidates. The instructions 710 may also be executed to perform ICE connectivity checks and conclude on ICE. The instructions 720 may be executed to transmit and receive ICE messages. Transmitting and receiving messages may include formatting messages according to ICE. Formatting the messages may include embedding a list of candidates in the ICE message.

Referring back to FIG. 2, the session border controller 130 is operable to support both ANAT and ICE and is operable to provide an interworking between the ANAT endpoint 110 and ICE endpoint 120. The session border controller 130 may be operable to transmit and/or receive an ANAT message and/or an ICE message. Additionally, the session border controller 130 is operable to read all, some, or none of the ANAT message and/or ICE message. The session border controller 130 may be operable to identify all of the network addresses 210 in a session description and/or all of the candidate addresses 250 in a session description. As a result, the media path is limited to being established between the network address listed first in an ANAT message and the candidate listed first in an ICE message. The session border controller 130 may dynamically chose among all of the network addresses and/or candidates.

The session border controller 130 may obtain one or more network addresses 210 associated with the ANAT endpoint 110. Obtaining the network addresses 210 may include receiving an ANAT message; transmitting an ANAT message that requests one or more network addresses 210 and receiving an ANAT message in response; or accessing a memory that stores a list of the one or more network addresses. In one example, the session border controller 130 transmits an SIP offer message to the ANAT endpoint 110. In response, the ANAT endpoint 110 transmits an SIP answer message being formatted according to the session description protocol (SDP). The SIP answer message includes a list of the one or more network addresses.

The one or more network addresses 210 may be included in a list of one or more network addresses 210. The list of one or more network addresses 210 may be formatted or unformatted and may include network addresses 210 from a single list or a combination of two or more lists. The list of one or more network addresses 210 may include all, some, or none of the network addresses 210 that may be used to communicate with the ANAT endpoint 110. The list of one or more network addresses 210 may be included in a session description.

The session border controller 130 may determine a preferred network address 240 for the ANAT endpoint 110. In one embodiment, determining a preferred network address 240 for the ANAT endpoint 110 may include identifying priority identifiers 230 for one, some, or all of the one or more network addresses 210. The priority identifiers 230 may be provided in an ANAT message transmitted from the ANAT endpoint 110. In an alternative embodiment, the session border controller 130 may receive one or more network addresses 210, calculate priority for the one or more network addresses 210 based on an ANAT endpoint preference, and assign priority identifiers 230. In order to determine a preferred network address 240, the session border controller 130 may compare all, some, or none priority identifiers 230 with each other. The network address 210 having a priority identifier 230 indicating the greatest preference may be selected as the preferred network address 240. One or more addresses may be preferred.

In one embodiment, the session border controller 130 may determine the priority identifiers 230 based on an ICE endpoint preference. The ICE endpoint preference may be a preference of an ICE endpoint 120. For example, if the selected ICE candidate is of a IPv6 address, then the preference for IPv6 address will be set to a higher value. The priority identifiers 230 may be determined based on other considerations or characteristics of the system 100.

The session border controller 130 may identify one or more candidates associated with the ICE endpoint 120. Identifying one or more candidates may include gathering candidates, receiving an ICE message having a list of candidates, or reading a list of candidates stored in computer readable storage media. In one example, the session border controller 130 sends a request message to the ICE endpoint 120. The request message may be an SIP offer message requesting candidates associated with the ICE endpoint 120. The ICE endpoint 120 may gather the candidates C1, C2 and send an ICE message with a list of the candidates C1, C2 to the session border controller 130.

The session border controller 130 may determine a corresponding candidate address 280. The corresponding candidate address 280 may correspond to the preferred network address 240. For example, corresponding candidate address 280 may correspond to the ANAT endpoint preference.

Determining a corresponding candidate address 280 may include calculating candidate priority for the one or more candidate addresses 250. The session border controller 130 may calculate candidate priority for one, some, or all of the identified candidates C1, C2. The candidate priority may be calculated based on an ANAT endpoint preference, ICE endpoint preference, or both an ANAT endpoint preference and an ICE endpoint preference. As used herein, the term "based on" may include as a function of, depending on, or as a result of. In one embodiment, the candidate priority may be determined using Equation 1.

$$\text{Candidate Priority} = (2^{24})*(\text{type preference value}) + (2^{8})*(\text{local preference variable}) + (2^{0})*256 - (\text{component ID value}).$$ Equation 1

The local preference variable may be an integer from 0 to 65535. The range from 0 to 65535 is a currently defined range. However, other ranges may be used. The local preference variable may represent a preference for a candidate address 250 from which the candidate was obtained. The local preference variable may be set to an appropriate value within the defined range based on the ANAT endpoint preference. For example, the ANAT endpoint preference may be a preference to use the latest version of the IP. Accordingly, based on the ANAT endpoint preference, candidate C1 may be assigned a local preference variable of 65534 and the candidate C2 may be assigned a local preference variable of 32345. The local preference variable may vary depending on the number of available network addresses and the ANAT endpoint preference.

The type preference value may indicate a preference for each type of candidate (e.g., server reflexive, peer reflexive, relayed and host), and, when the ICE endpoint 120 is multihomed, a preference for each type of candidate and a preference for the candidate address. The ICE endpoint 120 may be multihomed when connected to two or more networks or having two or more candidate addresses. The type preference may be an integer from 0 to 126 inclusive. Other ranges may be used. The type preference value may represent the preference for the type of the candidate (where the types are local, server reflexive, peer reflexive and relayed). A value of "126" may indicate the highest preference, and a "0" may indicate the lowest preference. The type preference value may be identical for all candidates of the same type and may be different for candidates of different types. The type preference value for peer reflexive candidates is higher than that of server reflexive candidates. The ICE endpoint 120 or the session border controller 130 may set a type preference variable for different candidate addresses based on the above rules. The Component ID value indicates a preference for the media protocol. For example, a Component ID value may be "1" for the real time protocol (RTP) and "2" for the real time control protocol (RTCP).

The candidate priority may be a priority identifier 280. For example, as shown in FIG. 2, the candidate priority and priority identifier 270 may be "25001" for candidate C1 and "22335" for candidate C2. However, in an alternative embodiment, the session border controller 130 may assign a priority identifier 280 for each of the candidates C1, C2. For example, the candidate address with the greatest candidate priority may be assigned a priority identifier of 280. In FIG. 2, since candidate C1 has the greatest candidate priority, candidate C1 may be assigned a priority identifier 270 of "1" and candidate C2 may be assigned a priority identifier 270 of "2." Each of the candidate addresses may be assigned a priority identifier 280.

The session border controller 130 may compare a priority identifier 270 to other priority identifiers to determine a corresponding candidate address 280. The candidate C1, C2 with the greatest or least priority identifier 270 may be determined to be the corresponding candidate address 280.

The session border controller 130 may establish a media session between the preferred network address 240 and the corresponding candidate address 280. Establishing the media session may include sending a message to the ANAT endpoint 110 identifying the corresponding candidate address 280, sending a message to the ICE endpoint 120, or a combination thereof.

The candidates may be paired. Pairing the candidates may include confirming that the corresponding candidate address may be used with the preferred network address. In the event that the corresponding candidate address with the greatest preference may not be confirmed, the session border controller 130 may select the candidate address with the next greatest preference. This may be repeated until a corresponding candidate address is confirmed. The session border controller 130 may check each candidate after assigning the priority to them. Once a corresponding candidate is confirmed, the session border controller 130 may send the ANAT endpoint 110 an ANAT message that identifies the corresponding candidate address 280.

Figure 8:
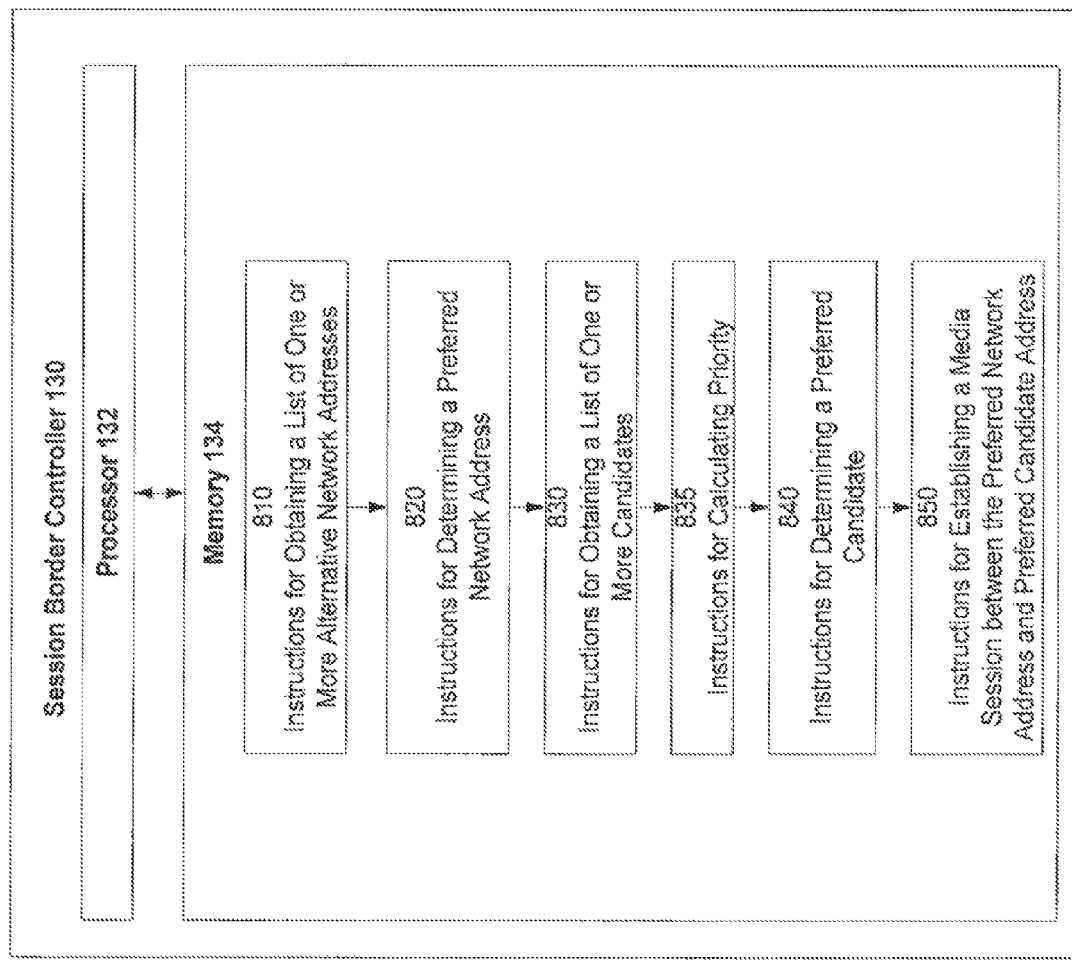
FIG. 8 illustrates one embodiment of a session border controller.

FIG. 8 illustrates one embodiment of a session border controller 130. The session border controller 130 may include a processor 132 and memory 134. The session border controller 130 may be part of, coupled with, or function in parallel to a router, gateway, or other communication device. The processor 132 may be coupled with the memory 134. The memory 134 may store computer-readable instructions. The computer-readable instructions may be executed by the processor 132. As used herein, computer-readable instructions may be processor-readable instructions.

The memory 134 may store computer-readable instructions. The computer instructions may include instructions for obtaining a list of one or more network addresses 810, instructions for determining a preferred network address 820; instructions for obtaining a list of one or more candidates 830; instructions for calculating priority 835; instructions for determining a corresponding candidate address 840; and instructions for establishing a media session between the preferred network address and a preferred candidate address. The memory 134 may include additional, different, or fewer instructions.

The instructions for obtaining a list of one or more network addresses 810 may be executed to obtain a list of one or more network addresses. The instructions 810 may include instructions for receiving an ANAT message that includes a list of the one or more network addresses, transmitting an ANAT message that requests a list of the one or more network addresses, receiving an ANAT message that answers a request and provides a list of the one or more network addresses, accessing a memory to obtain a list of the one or more network addresses instructions, or a combination thereof.

The instructions for determining a preferred network address 820 may be executed to determine a preferred network address. The instructions 820 may include determining one or more priority identifiers for the one or more network addresses; comparing the one or more preference identifiers with each other; and selecting a network address with the preference identifier that indicates that the network address is preferred. Selecting a network address may include selecting a network address with the greatest preference.

The instructions for obtaining a list of one or more candidates 830 may be executed to obtain a list of one or more candidates. The instructions 830 may include instructions for gathering candidates, such as server reflexive, peer reflexive, relayed and host candidates, or receiving a message including gathered candidates. The instructions 835 may include instructions for calculating candidate priority of each candidate based on ANAT endpoint preference. The instructions for determining a preferred candidate address 840 may be executed to determine a preferred candidate address. Determining a preferred candidate address may be based on the candidate priority calculated with instructions 835. The instructions for establishing a media session between the preferred network address and a preferred candidate address 850 may be executed to a media session between the preferred network address and a preferred candidate address.

The processors 112, 122, and 132 may be general processors, digital signal processors, application specific integrated circuits, field programmable gate arrays, analog circuits, digital circuits, combinations thereof, or other now known or later developed processors. The processors 112, 122, and 132 may be single devices or a combination of devices, such as associated with a network or distributed processing. Any of various processing strategies may be used, such as multi-processing, multi-tasking, parallel processing, or the like. Processing may be local, as opposed to remote. For example, the processor 132 is operable to perform processing completed by the processor 112. The processors 112, 122, and 132 are responsive to instructions stored as part of software, hardware, integrated circuits, firmware, micro-code or the like.

The memories 114, 124, and 134 are computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memories 114, 124, and 134 may be a single device or a combination of devices. The memories 114, 124, and 134 may be adjacent to, part of, networked with and/or remote from the processors 112, 122, and 132.

The memories 114, 124, and 134 may store data representing instructions executable by the programmed processors 112, 122, and 132. The processors 112, 122, and 132 are programmed with and execute the instructions. The functions, processes, acts, methods or tasks illustrated in the figures or described herein are performed by the programmed processors 112, 122, and 132 executing the instructions stored in the memory 114, 124, and 134. The functions, acts, processes, methods or tasks are independent of the particular type of instructions set, storage media, processor or processing strategy and may be performed by software, hardware, integrated circuits, firm ware, micro-code and the like, operating alone or in combination.

Figure 9:
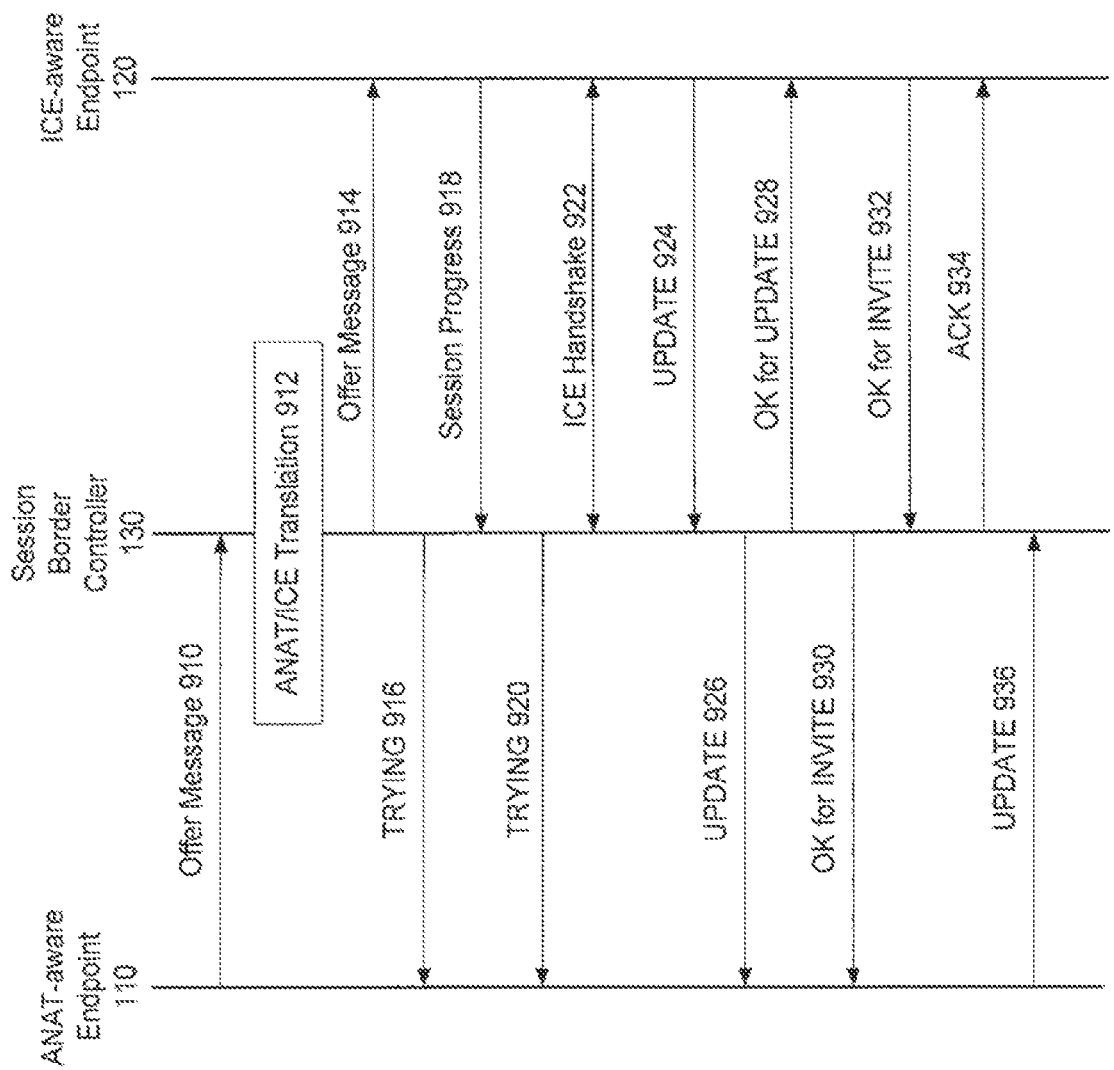
FIG. 9 illustrates one embodiment of establishing a media session using the session initiation protocol (SIP)

FIG. 9 illustrates one example of establishing a media session between the ANAT endpoint 110 and the ICE endpoint 120 using the session initiation protocol (SIP). In FIG. 9, the ANAT endpoint 110 is initiating the media session, such as a VoIP session. However, in other examples, the ICE endpoint 120 may initiate the media session. As shown in FIG. 9, the session border controller 130 may receive an offer message 910 from the ANAT endpoint 110. The offer message 910 may request a messaging session with the session boarder controller 130. The offer message 910 may be a session initiation protocol (SIP) offer, for example, SIP INVITE, with a session description protocol (SDP) having ANAT semantics. The offer message 910 may include one or more network addresses for a particular media stream for the ANAT endpoint 110. The offer message 910 may also include preference identifiers for each of the one or more network addresses 210. The session border controller 130 may receive the offer message 910.

The session border controller 130 may perform ANAT/ICE translation 912. Performing ANAT/ICE translation may include determining a preferred network address for the ANAT endpoint 110, gathering candidates for the ICE endpoint 120; determining a preferred candidate based on network parameters and candidate parameters; and determining a preferred candidate address based on the preferred candidate. Once the preferred candidate address is determined, the session border controller may establish a media session path between the preferred network address and the preferred candidate address.

The session border controller 130 may send a Trying message 916 to the ANAT endpoint 110 when trying to set up an SIP messaging session with the ICE endpoint 120. Once the session border controller 130 receives an Answer Message 918 to the Offer Message 914, the session border controller 130 may perform an ICE Handshake 922 with the ICE endpoint 120. The ICE Handshake may include a connectivity check. The session border controller 130 may send or receive an UPDATE 924 and 926 to update the selected addresses which may include preferred network address for the ANAT endpoint 110 and a preferred candidate address for the ICE endpoint 120. The session border controller 130 may conclude the messaging session with the UPDATE/INVITE transactions in 928 to 936.

FIG. 9 illustrates the ANAT endpoint 110 initiating the messaging session. In other embodiments, the ICE endpoint 120 may initiate the messaging session. In other words, the session border controller 130 is operable to provide bidirectional interworking. The session border controller 130 may translate communication from an ANAT endpoint 110 to the ICE endpoint 120; and also, from an ICE endpoint 120 to an ANAT endpoint 110.

Figure 10:
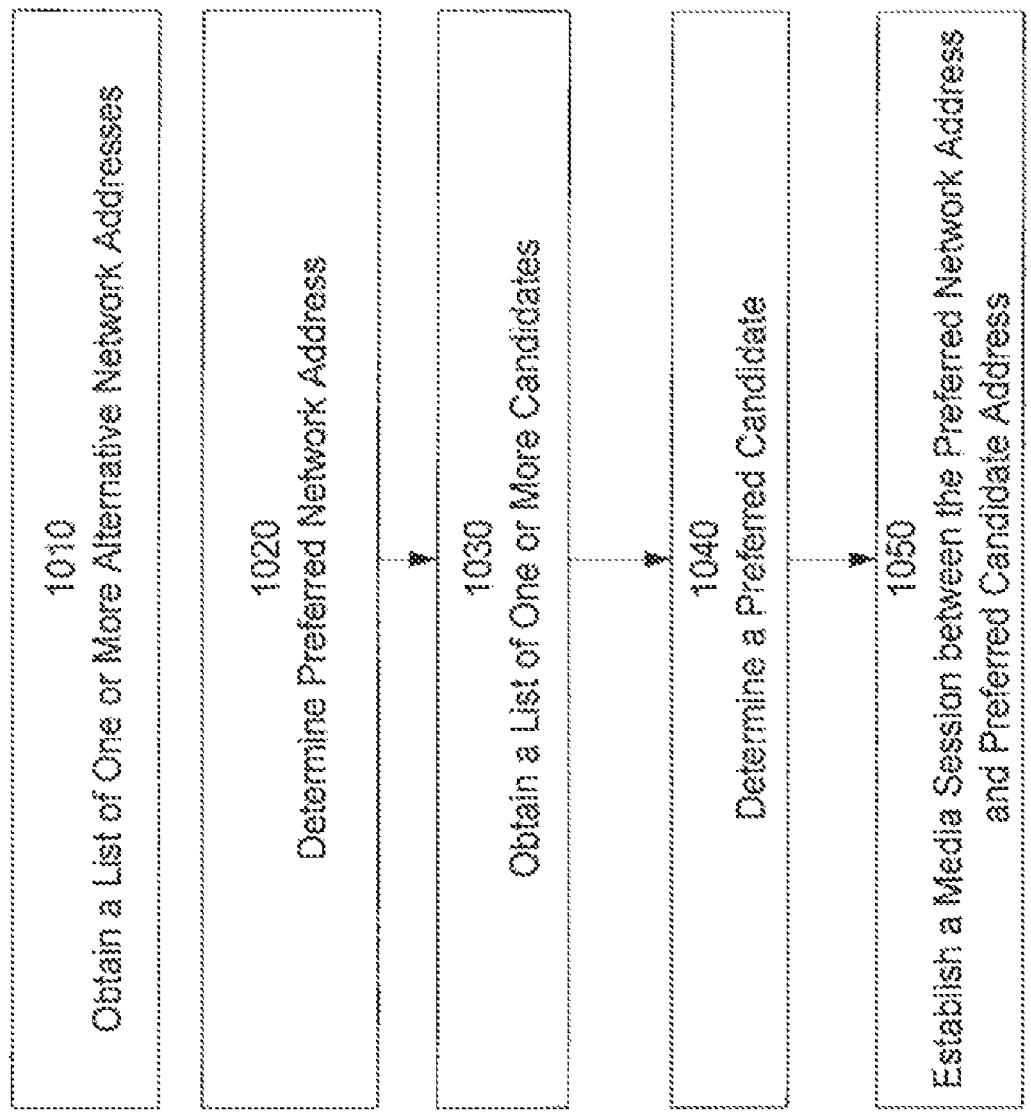
FIG. 10 illustrates one embodiment of a method for establishing a media session path between a preferred network address and a preferred candidate address.

FIG. 10 shows a method 1000 for establishing a media stream path between a preferred network address and a preferred candidate. The method is implemented using the system 100 of FIG. 1 or a different system. The acts may be performed in the order shown or a different order. The acts may be performed automatically, manually, or the combination thereof.

As shown in FIG. 10, the method 1000 includes determining preferred identifiers for one or more network addresses assigned to a first endpoint, identifying a preferred network address, identifying one or more candidates for a second endpoint, determining candidate parameters for the one or more candidates, calculating priorities for the one or more candidates, determining a preferred candidate, and establishing a media stream path between a preferred network address and a preferred candidate address.

In act 1010, the session border controller may obtain a list of one or more network addresses assigned to a first endpoint. The list may be a table, chart, illustration, description, or other listing of the one or more network addresses. The list may be formatted or unformatted. The list may include network addresses from a single list or a combination of two or more lists. The one or more network addresses may be used for communicating with the first endpoint. Obtaining the network addresses may include receiving an offer message from the first endpoint (e.g., when the first endpoint is the offeror); transmitting a request message, which requests the one or more network addresses, to the first endpoint and receiving an answer message (e.g., when the first endpoint is the offeror); or accessing a memory that stores a list of the one or more network addresses. The offer message or answer message may include a list of the one or more network addresses.

In act 1020, a session border controller may determine a preference identifier for one, some, or all of the one or more network addresses assigned to the first endpoint. The preference identifiers may be determined based on preference of the one or more network addresses. Preference for the one or more network addresses may be determined based on first endpoint parameters, such as the version of a protocol (e.g., IPv4 or IPv6) associated with the one or more network addresses. For example, greater preference may be given to newer versions of a protocol. The greater the preference, the better (e.g., higher or lower) the preference identifier. The preference identifiers for all, some, or none of the network addresses may be compared to each other. The network address with the best identifier may be chosen as the preferred network address for the first endpoint, as shown in act 1020. Alternatively, preference identifiers are not determined or used. The preference network address for the first endpoint is chosen based on preference of the one or more network addresses, without using preference identifiers.

In one embodiment, determining the preference identifiers includes receiving the preference identifiers from the first endpoint. The first endpoint may assign preference identifiers to each network address. The session border controller may identify the preference identifiers, compare the preference identifiers to each other, and determine a network address with the best preference identifier. As a result, the session border controller may choose the alternative network address with the best preference identifier as the preferred network address for the first endpoint.

In act 1030, the session border controller may identify one or more candidates for a second endpoint. Identifying one or more candidates may include gathering a server reflexive candidate, peer reflexive candidate, relayed candidate, host candidate, or a combination thereof. Gathering candidates may include sending a request message, for example, using a STUN server or TURN server. The STUN response received to a request sent to STUN server may have the server reflexive candidate in the MAPPED-ADDRESS attribute. The STUN response received to a request sent to the TURN server may have the relayed address allocated by TURN server in the XOR-RELAYED-ADDRESS attribute. A peer reflexive address may be gathered during ICE connectivity checks by discovering other NATs in the media path. The candidates may have or be associated with candidate parameters, such as a protocol version, type, port number, or messaging protocol. The session border controller may determine one or more of the candidate parameters, as shown in act 1040. As an alternative to sending a request message, the session border controller may identify one or more candidates by reading a list of candidates associated with the second endpoint. The list of candidates may be stored in computer readable storage media.

In act 1050, the session border controller may calculate candidate priority for one, some, or all of the identified candidates. Calculating priority for a candidate may include determining a type preference for each type of candidate, determining a local preference for the candidate, and determining a component ID. The local preference may be the preference given by the ANAT endpoint. For example, the Priority for a candidate may be equal to $(2^{24})*(\text{type preference})+(2^{8})*(\text{local preference})+(2^{0})*256-(\text{component ID})$.

An ICE agent computes the priority by determining a preference for each type of candidate (server reflexive, peer reflexive, relayed and host), and, when the agent is multihomed, choosing a preference for its IP addresses. These two preferences are then combined to compute the priority for a candidate. The local preference may be an integer from 0 to 65535 inclusive. It represents a preference for the particular IP address from which the candidate was obtained, in cases where an agent is multihomed. This local preference may be set to appropriate value based on ANAT address priority.

The priority identifiers may be compared to each other to determine a preferred candidate, as shown in block 860. The candidate with the greatest or least priority may be determined to be the preferred candidate. The inter-working function may include calculating a priority of each of the candidates based on a preferred network address and/or network address parameters.

In act 1080, the session border controller may establish a media session between the preferred network address and the preferred candidate address. Establishing the media session may include, sending a message to the second endpoint identifying the preferred candidate. The candidates are paired. The session border controller may check for each pair after assigning the priority to them. Once the controlling agent finds a pair that is successful it can chose to send an ICE conclude message. Once a preferred candidate is confirmed, the session border controller sends the first endpoint a message that identifies the preferred candidate.

One benefit of using the session border controller to translate and relay messages between the ANAT endpoint and the ICE endpoint is that each of the addresses and ports disclosed in the ANAT messages and ICE messages may be considered when establishing a path. As a result, a preferred address of the ANAT endpoint and a corresponding address of the ICE endpoint may define the media stream path.

Various embodiments described herein can be used alone or in combination with one another. The detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A method for establishing a media session path, comprising:
   receiving a message from a first endpoint that includes a list of one or more network addresses, wherein the first endpoint is an alternative network address type (ANAT) endpoint;
   determining a preferred network address from the one or more network addresses based on a first preference of the first endpoint;
   obtaining a list of one or more candidates used by a second endpoint to traverse network address translation (NAT) network devices, wherein the second endpoint is an interactive connectivity establishment (ICE) endpoint;
   determining a corresponding candidate address from the one or more candidates based on the first preference; and
   transmitting a first message to the first endpoint and a second message to the second endpoint, the first message defining a corresponding candidate address and the second message defining the preferred network address, the corresponding candidate address and the preferred network address being operable to be used to establish a media session path between the first endpoint and the second endpoint.

2. The method of claim 1, wherein determining a preferred network address includes:
   determining one or more preference identifiers for the one or more network addresses;
   comparing the one or more preference identifiers with each other; and selecting a network address based on the comparison, the selected network address having a preference identifier indicating that the selected network address is preferred over the other network addresses, the selected network address being the preferred network address.

3. The method of claim 1, wherein obtaining a list of one or more candidates includes gathering server reflexive candidates, peer reflexive candidates, relayed candidates and host candidates.

4. The method of claim 3, wherein gathering candidates includes using Session Traversal Utilities for NAT and Traversal Using Relay NAT.

5. The method of claim 3, wherein determining a corresponding candidate address includes:
   calculating one or more priority identifiers for the gathered candidates based on the first preference;
   comparing the one or more priority identifiers with each other; and
   selecting a candidate with a priority identifier that indicates that the candidate is preferred, the selected candidate having a corresponding candidate address.

6. The method of claim 5, wherein the first preference is a preference to use a latest version of the Internet Protocol.

7. A session border controller comprising:
   a processor operable to execute instructions; and
   a memory coupled with the processor, the memory storing instructions that may be executed to:
   identify one or more network addresses for communicating with a first endpoint, wherein the first endpoint is an alternative network address type (ANAT) endpoint;
   determine a preferred network address from the one or more network addresses, the preferred network address being determined based on a preference for communicating with the first endpoint;
   identify one or more candidates used by a second endpoint to traverse network address translation (NAT) network devices, wherein the second endpoint is an interactive connectivity establishment (ICE) endpoint; and
   determine a corresponding candidate address from the one or more candidates, the corresponding candidate address being determined based on the preference for communicating with the first endpoint.

8. The session border controller of claim 7, wherein the memory stores instructions that may be executed to:
   receive a message from the first endpoint, the message including the list of one or more network addresses, and extract the one or more network addresses from the message.

9. The session border controller of claim 7, wherein the memory stores instructions that may be executed to:

determine one or more preference identifiers for the one or more network addresses;

compare the one or more preference identifiers with each other; and select a network address with the preference identifier that indicates that the network address is preferred, the selected network address being the preferred network address.

10. The session border controller of claim 7, wherein the memory stores instructions that may be executed to gather server reflexive candidates, peer reflexive candidates, relayed candidates and host candidates.

11. The session border controller of claim 10, wherein the memory stores instructions that may be executed to:

calculate one or more priority identifiers for the gathered candidates based on the preference for communicating with the first endpoint;

compare the one or more priority identifiers with each other; and select a candidate with a priority identifier that indicates that the candidate is preferred over other candidates, the selected candidate having a corresponding candidate address.

12. The session border controller of claim 10, wherein the memory stores the preference for communicating with the first endpoint, the preference being a preference to communicate with a preferred Internet Protocol (IP) version.

13. The session border controller of claim 12, wherein the IP version is IPv4 or IPv6.

* * * * *